United States Patent [19]  
Kimura

[11] 3,857,449  
[45] Dec. 31, 1974

[54] APPARATUS FOR PRECISELY THRUSTING PIPES INTO THE GROUND

[76] Inventor: Yoshita Kimura, c/o Kogane; Sky-cooporas 807, No. 40-1, 3-chome, Maehara-cho, Tokyo, Japan

[22] Filed: July 5, 1973

[21] Appl. No.: 376,316

[30] Foreign Application Priority Data
July 11, 1972  Japan.................. 47-69239
Dec. 15, 1972  Japan................ 47-125981
Feb. 26, 1973  Japan.................. 48-22978
Apr. 20, 1973  Japan.................. 48-37575

[52] U.S. Cl......................... 175/26, 175/45, 299/1, 33/304
[51] Int. Cl............................................. E21b 47/02
[58] Field of Search............ 175/45, 40, 24, 26, 62, 175/73, 61, 76; 299/1; 33/304, 315

[56] References Cited
UNITED STATES PATENTS

| | | | |
|---|---|---|---|
| 2,647,726 | 8/1953 | Kirk | 175/62 X |
| 3,482,103 | 12/1969 | Martinsen | 299/1 X |
| 3,484,136 | 12/1969 | Colson | 299/1 |
| 3,498,673 | 3/1970 | Ledray | 299/1 |
| 3,526,285 | 9/1970 | Adkins et al. | 175/73 |
| 3,554,301 | 1/1971 | Adkins et al. | 175/24 |

Primary Examiner—Frank L. Abbott  
Assistant Examiner—Richard E. Favreau  
Attorney, Agent, or Firm—Fleit & Jacobson

[57] ABSTRACT

Herein disclosed is an improved apparatus for precisely thrusting pipes into the ground along a predetermined straight guide line. The apparatus includes a guide tube coaxially inserted in the pipe and actuated for proceeding and rotation, and an augar coaxially attached to the front end of the guide tube for excavating the front soil. In the apparatus, a laser beam source is used for generating a laser beam as the guide line which is normally running forward on the axis of the guide. This laser beam is reflected on a parallel reflector which is disposed at a relatively front portion of the guide tube in a manner to have its critical optical path coincident with the axis of the guide tube. In the apparatus, a displacement detecting device is also provided for detecting actual displacement of the common axis of the auger and the guide tube from the laser beam guide line in terms of optical displacement of the reflected backward laser beam from the forward laser beam. To this optical displacement is responsive a displacement correcting mechanism, which is interposed between relatively front portions both of the pipe being thrusted and the guide tube, so that the guide tube may be deflected relative to the pipe in the radial direction to reduce the actual displacement.

10 Claims, 11 Drawing Figures

Patented Dec. 31, 1974 3,857,449

APPARATUS FOR PRECISELY THRUSTING PIPES INTO THE GROUND

BACKGROUND OF THE INVENTION

1. Field of the Invention

The present invention relates to improved technology for laying under ground pipes for utility facilities such as electric wirings, city gases, water supply, or sewage services. The present invention relates, more particularly, to an improved apparatus for precisely thrusting a pipe into the earth along a straight guide line for the above technology.

2. Description of the Prior Art

As is well known in the art, the pipe-thrusting method is one of the most suitable method for laying pipes under ground for the civil engineering purposes, when it is applied to the ground which has such surfaces as is paved with asphalt, as has congested traffics or as has rail roads thereon. This is because the surfaces under such conditions cannot be excavated without being accompanied by considerable disadvantages. In a typical pipe-thrusting method, vertical pits are formed at a suitable spacing from each other, and then the directions of thrusting a pipe is determined from the side wall of one of the vertical pits. After that, the pipe is just forcedly thrusted into the ground from the side wall in the determined direction.

In another method, a suitable bit or auger is attached to the leading end of the pipe for excavation. In this method, more specifically, the pipe is proceeded in the forward direction while the front soil is excavated by turning the pipe together with the bit and concurrently by conveying to the outside the excavated soil which might steal into the pipe.

Although the latter method is considerably superior in the working efficiency to the former, however, both can not be free from a serious trouble coming from the fact that they are not provided with any direction control device. That is, even with the initial direction being determined precisely, the pipe will miss the correct path in the course of proceeding. One of the major reasons for this undesirable phenomenon is considered to result from that characters of the ground vary according to the position. This phenomenon is especially prominent where it is intended to bury several pipes into the ground in parallel with and at a limited spacing from each other.

Another method has been developed which succeeds in ensuring more precision in thrusting a pipe into the ground. In this method, a strong wire such as piano wire is as the guide line. Since, however, surplus steps, for example, of forming guide holes and cutting the ground by the piano wire are included the advanced precision will be offset by the increased time and labour consumption. And, this method has such a drawback that it cannot be used where the earth is hard or rocky. This is because the earth is more or less cut by the piano wire.

SUMMARY OF THE INVENTION

It is, therefore, a primary object of the present invention to provide an improved apparatus for precisely thrusting a pipe into the ground for a variety of civil engineering purposes.

Another object of the invention is to provide an improved apparatus for precisely thrusting a pipe into the ground along a predetermined straight guide line.

Still another object is to provide an improved apparatus of the above type, in which a highly directive light such as a laser beam is used as the above straight guide line.

A further object is to provide an improved apparatus of the above type, in which displacement, if any, of the pipe proceeding direction from the straight guide line is detected in terms of displacement of the backward reflected light beam from the forward laser beam.

A further object is to provide an improved apparatus of the above type, in which the pipe proceeding direction is continuously corrected by hydraulically deflecting a concentric guide tube relative to the pipe in the direction to reduce the optical displacement.

A further object is to provide an improved apparatus of the above type, in which flexure of the pipe is eliminated even if the total length of the pipe is made considerably large.

BRIEF DESCRIPTION OF THE DRAWINGS

Other objects and advantages of the present invention will be apparent from the description taken in conjunction with the accompanying drawings, in which.

DESCRIPTION OF THE PREFERRED EMBODIMENTS

Figure 1:
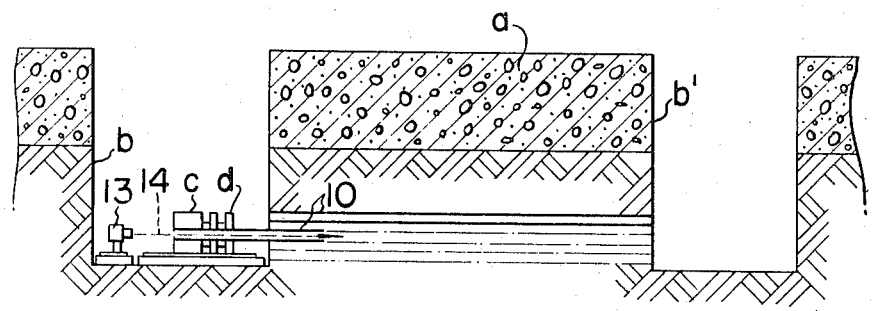
FIG. 1 is a vertical section of the ground and shows the thrusting operation according to the present invention.

Referring now to FIG. 1, let it be assumed to thrust several pipes 10 horizontally into the ground having its surface $a$ paved with asphalt. Then, vertical pits $b$ and $b'$ are dug at a suitable spacing inbetween, as shown. In the starting side pit $b$, is installed a thrusting apparatus $c$ which may be of any conventional type if it can apply a thrust to the pipes 10 and an excavating action to a guide tube 11 and accordingly to a bit or auger 12, as better shown in FIG. 2. A holding apparatus $d$ is also installed in the pit $b$ for holding the pipes 10 in position. In order to provide a guide line, on the other hand, a light source 13 of a highly directive light beam such as a laser beam 14 is disposed on a rear extension of the axis of the guide tube 11.

Figure 2:
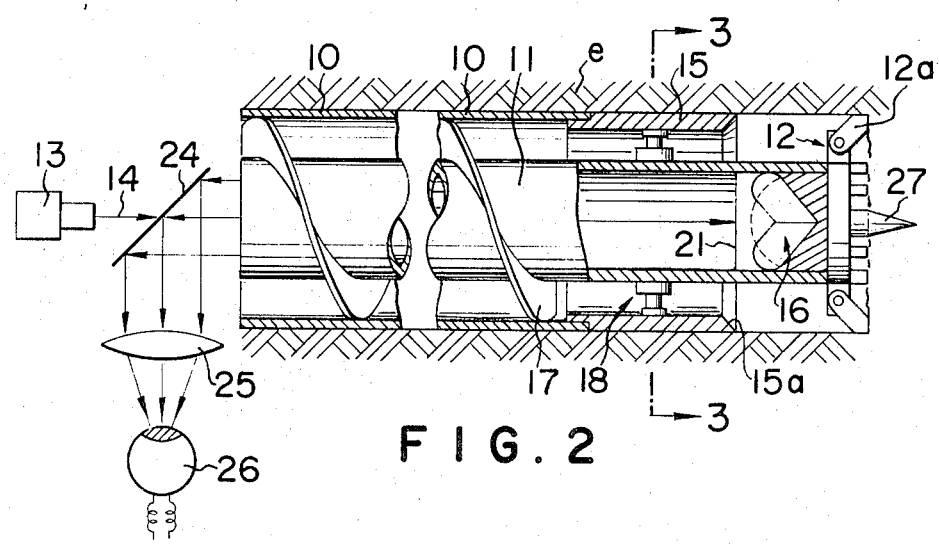
FIG. 2 is a partially enlarged sectional view showing arrangement of a pipe-thrusting apparatus of the present invention.

As better seen from FIG. 2, a leading cylindrical member 15 having a sharpened edge 15a is detachably secured to the front end of the pipe 10. The guide tube 11 is at normally conditions, coaxially inserted in the pipe 10 and has its foremost end extending from the sharpened edge 15a of the leading member 15. The auger 12 is also coaxially attached to the foremost end of the guide tube 11 so as to excavate the front earth e when it is rotated and thrusted forward together with the guide tube 11. A parallel reflector 16 is also mounted in a relatively front portion of the guide tube 11 and has a critical optical path, which will be detailed later. A screw conveyor 17 may preferably be mounted on the outer wall of the guide tube 11 in sliding contact with the corresponding inner wall of the pipe 10 so as to convey the excavated soil rearward when it is rotated together with the guide tube 11.

Figure 3:
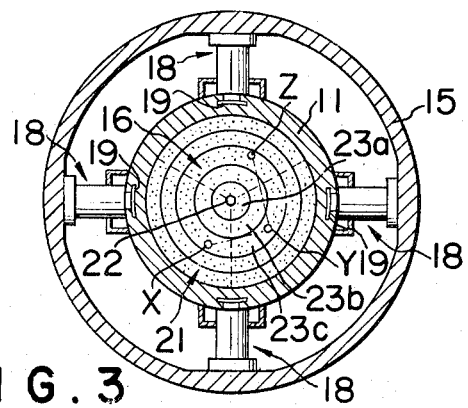
FIG. 3 is a cross section taken along the line 3 — 3 of FIG. 2.

Between a relatively front portion of the guide tube 11 and the leading member 15 or a corresponding front portion of the pipe 10 is interposed a displacement correcting mechanism 18 which may be provided with a suitable number of hydraulic jacks for deflecting the guide tube 11 relative to the pipe 10 when actuated in response to the displacement of the axis of the auger 12 from the guide line or the laser beam 14. These hydraulic jacks may preferably angularly spaced from each other and have fluid communication with a suitable actuator (not shown) by way of one of pilot conduits 19, which are formed in the wall of the guide tube 11 (as exemplified in this embodiment), as shown in FIG. 3. The pilot conduits 19 may alternatively be mounted on the inner or outer surface of the guide tube 11. The detailed discussion of the displacement correcting mechanism 18 will be made later with reference to FIGS. 7 to 9.

The auger 12 is formed with a cutter blade 12a which may preferably be hinged to the periphery so as to be reduced in its diameter such that it may pass through the inside of the guide tube 11 for repairing or replacing purposes.

The parallel reflector 16 may include a cube corner composed of three mirrors, as is well knonw in the art. This cube corner is mounted in a relatively front portion of the guide tube 11, that is, in the vicinity of the auger 12 and in a manner to have its critical optical path coincide with the axis of the auger. Thus, the cube corner has such optical characteristics as to have reflected light rays follow the critical optical path, when incident light rays follow the same path, and as to produce reflected light rays in parallel with incident light rays which have missed the critical optical path.

In this embodiment, an optical plate 21 is disposed midway of an optical path between the light source 13 or a laser beam generator and the parallel reflector 16. The optical plate 21 is, however, shown to be positioned in the vicinity of the parallel reflector 16. This plate 21 may preferably have an aperture or central pin hole 22 which is sized and positioned to allow the forward laser beam to pass therethrough. As better understood from FIG. 3, the optical plate 21 includes a filter element having its light transmissivity radially varied, in other words, the filter element is composed of several filter rings 23a, 23b, 23c and so on, which have stepwise different light transmissivities. This filter element may be of any type if it has its light transmissivity varied from the center to the periphery. Thus, the central pin hole 22 may be replaced by a transparent circular plate. In a modification, the three mirrors constituting the cube corner may be covered with a filter layer which has its light transmissivity varied from its apex.

In order to obviate undesirable scattering and/or attenuation of the laser beam in the inside of the guide tube 11, it is considered desirable to seal the guide tube 11 and/or to prevent humidity from being produced inside thereof.

In operation, the positioning of the laser beam generator 13 which is installed in the vertical pit b is made such that the proceeding direction of the laser beam 14 is coincident precisely with the axis of the pipe 10. And, another positioning is also made to cause the laser beam 14 to pass through a half mirror 24, which is disposed midway of an optical path between the generator 13 and the cube corner 16, into the inside of the guide tube 11 and further to pass through the center pin hole 22 of the optical plate 21. These positionings can be accomplished in advance by adjusting the holding apparatus d.

For explanatory purposes only, such assumption will be made in the following that the light transmissivities of the filter rings 23a, 23b, 23c and so on are decreased in these orders.

In a normal operation without any undesirable displacement, the laser beam 14 emitted from the generator 13 will proceed to the apex of the cube corner 16 through the center pin hole 22, thus acting as the guide line. The laser beam 14, which has been incident on particular apex, will then be reflected thereon to return toward the half mirror 24 by following the same optical path. Then, the laser beam is guided sideways by the half mirror toward a focussing lens system 25. The laser beam 14 thus focussed is then received by a photoelectric converter 26, in which the light is converted into an electric signal. The detected intensity of this electric signal is adopted as a reference level, because the laser beam in this instance has passed through the center pin hole 22 and has a maximum intensity.

Under this normal condition, the guide tube 11 is rotated and thrusted together with the auger 12, so that the front soil e is excavated to offer a hole for the pipe 10. As shown in FIG. 2, the auger is formed as its center with a centering pin 27, which is to be inserted into the soil e so as to reduce deviation of the auger 12 as a whole. This action of the centering pin 27, however, cannot be expected so much, and when the front soil e has radially different hardness, then the proceeding direction of the auger 12 will turn toward the softer direction. This will be accompanied by the inclination of the critical optical axis of the cube corner 16. As a result, the incident point of the laser beam is shifted, for example, to a point X, as shown in FIG. 3. Then, the incident beam will pass through the filter ring 23c and will be reflected twice at points Y and Z. As has been discussed in the beforehand, the reflected beam emanating from the last point Z will return in parallel with the incident beam which enter the first point X. If it is, in this instance, assumed that the angle of inclination of the incident light beam be sufficiently small with respect to the critical optical path, then the returning rearward light beam will pass again through the optical plate 21 in the neighborhood of the filter ring 23c. Thus, the light beam entering the photoelectric converter 26 has a considerably reduced quantity, because the returning beam is considerably attenuated while it passes twice through the filter ring 23c.

Since, in this instance, the maximum quantity has already been measured under the normal condition, the order of displacement of the axis of the auger 12 from the guide line is detected in terms of the deviation in the quantities of light from the predetermined reference level. In place of this quantitative measurement, a suitable warning device such as a buzzer may also be used which is electrically connected to a suitable comparator operative to compare the detected electric signal with the reference level so as to energize the warning device when the differential inbetween exceeds a predetermined level.

When, on the other hand, the above displacement is detected, then the rotation of the guide tube 11 and accordingly of the auger 12 is temporally stopped, and the guide tube 11 is retracted to draw out the centering pin 27 from the soil e. Then, oil under pressure is supplied to one of the hydraulic jacks of the displacement correcting mechanism 18 through one of the corresponding pilot conduits 19. As easily understood, the leading cylindrical member 15 is fitted to the pipe 10 and is made immovable by the surrounding soil e, the guide tube 11 is deflected relative to the stationary pipe 10 by the action of the selected jack. Then, the incident point of the coming laser beam on the cube corner 16 is shifted to vary the intensity of the obtained electric signal. This shift should be made until the obtainable intensity becomes maximum. In this instance, another deflection should be made perpendicularly of the former deflection by actuating another or other jacks to locate the maximum point of the obtainable light intensity. If this second maximum point has been obtained, this implies that the axis of the cube corner 16 and accordingly of the auger 12 has been coincident with the forward laser beam 14 or the guide line, as will be quite easily understood.

After this procedure, the guide tube is thrusted again into the ground to have the centering pin 27 restore its operational position. Then, the oil pressure prevailing in the selected jacks is relieved, and the guide tube 11 and the auger 12 are again rotated and thrusted, thus starting again the pipe-thrusting operation.

If, in the actual practices, the cube corner 16 should continue vibrations so that the measurement of the light intensity could not be performed with sufficient accuracy, then it would be advisable to periodically stop the thrusting operation so as to carry out the above measurement. However, the precise pipe-thrusting operation under consideration can also be accomplished by continuously detecting the mean value of intensity of the returning light beam, even with such vibrations.

The hydraulic jacks for the displacement correcting mechanism 18 are shown as of piston type, but may be of oil-injecting type.

The laser beam as used in the above may also be replaced by another light beam, if it has a high directivity and a high intensity.

Figure 4:
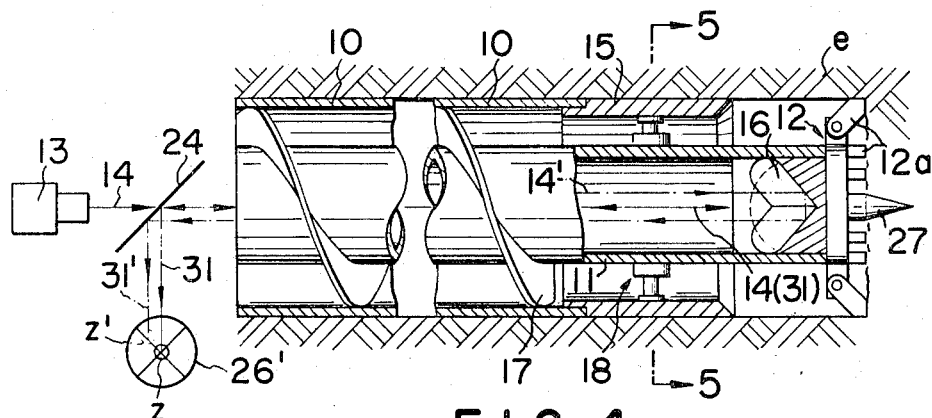
FIG. 4 is similar to FIG. 2 but shows another embodiment of the invention.
Figure 5:
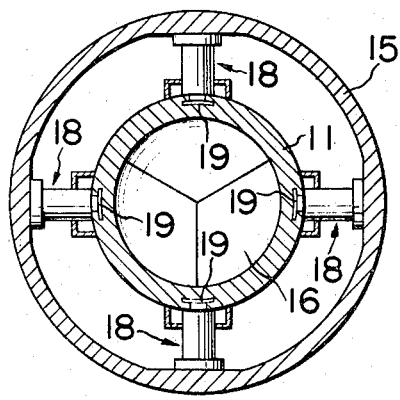
FIG. 5 is a cross section taken along the line 5 — 5 of FIG. 4.
Figure 6:
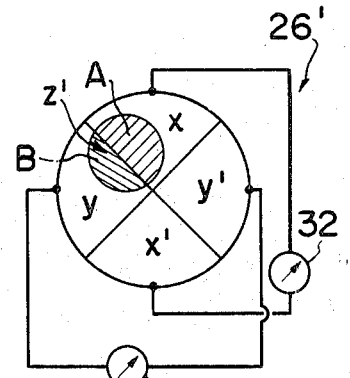
FIG. 6 is a plan view showing the operating principle of a displacement detecting device as used in the present apparatus.

Turning now to FIGS. 4 to 6, another displacement detecting device is shown, in which like numerals will indicate like elements as shown in FIGS. 1 to 3. In this embodiment, however, the optical plate 21 is eliminated and the lens system 25 may be dispensed with. Thus, the principle underlying this embodiment is to detect the particular displacement directly in terms of special displacement of the returning laser beam.

In more detail, the returning laser beam, as indicated at numeral 31, is guided sideways by the half mirror 24 toward a photoelectric converter 26'. This converter 26' may include four quadrant photoelectric elements $x, y, x'$ and $y'$ which are electrically isolated from each other for generating electric signals independently of each other. It should be noted here again that the reflected laser beam, which has followed the guide line, will enter the center of the photoelectric converter 26'. If, on the other hand, the four photoelectric elements $x, y, x'$ and $y'$ are made of photo-cells, then two potentiometers 32 and 32' acting as a kind of comparator are interposed, respectively, into the electrical connections between the photocell elements $x$ and $x'$ and between the photo-cell elements $y$ and $y'$. However, the photoelectric elements may be of suitable photoconductive type, and then the potentiometers 32 and 32' may be replaced by ammeters or the like which are used with suitable power sources.

With these construction arrangements, more specifically, the quantities of light distributed among the quadrants $x, y, x'$ and $y'$ will be equal to make the potentiometers 32 and 32' indicate zero level, if the forward laser beam 31 enter the apex of the cube corner 16 and accordingly the backward beam 31 hit the center of the photoelectric converter 26', as shown at letter $z$.

If, to the contrary, the returning light beam 31' is deviated from the center of the converter 26', as shown at letter $z'$ in FIGS. 4 and 6, then the partial area A of the spot $z'$ may belong to the quadrant $x$ while the area B to the quadrant $y$. In this instance, the indicator needles of the potentiometers 32 and 32' will exhibit deviations, the direction and level of which will depend, respectively, upon the ratios of the areas A and B to the areas $x$ and $y$, as will be easily understood.

In these ways, the radial direction and the extent of the displacement can be obtained. With these informations, the displacement can be corrected in the similar manner to the embodiment as described in conjunction with FIGS. 1 to 3, and as such being the case repeated explanation of the manner of correction will be omitted here.

Figure 7:
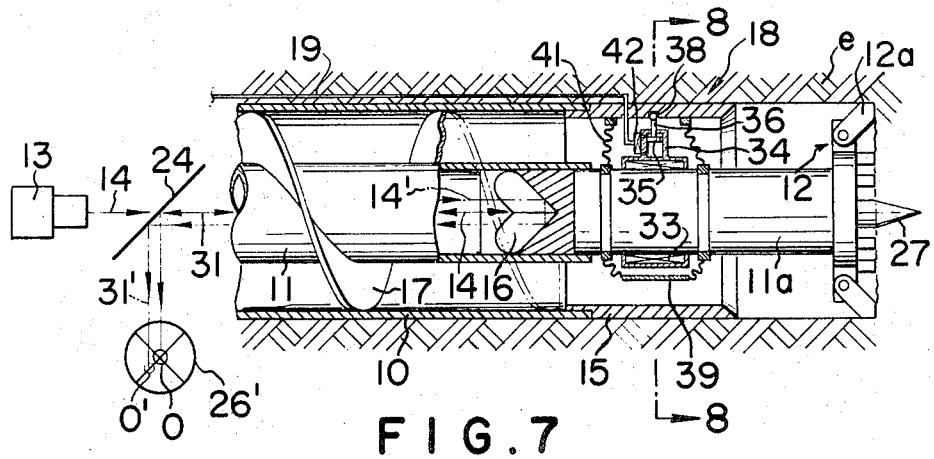
FIG. 7 is similar to FIGS. 2 and 4 but shows another embodiment of the invention.
Figure 8:
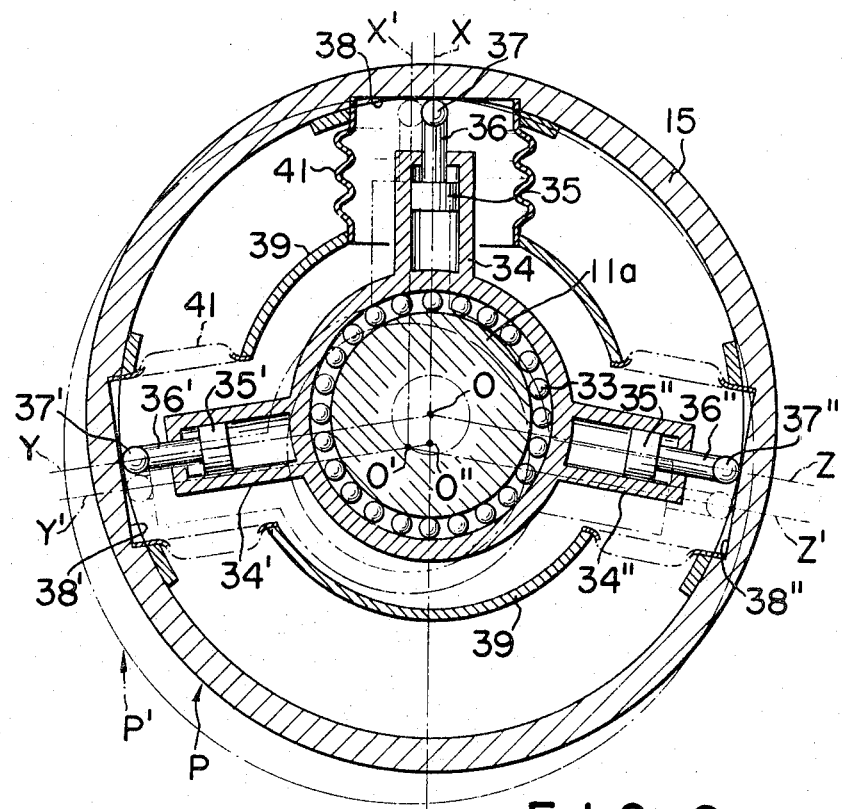
FIG. 8 is a cross section taken along the line 8 — 8 of FIG. 7.
Figure 9:
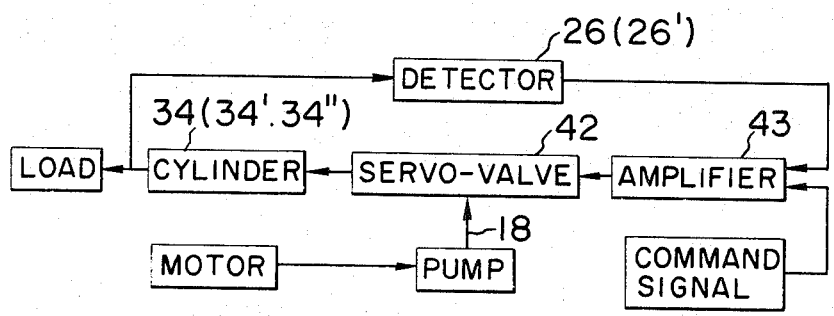
FIG. 9 is a block diagram showing an automatic control circuit of a displacement correcting mechanism as used in the present apparatus.

The displacement correcting mechanism 18 will now be described in more detail with reference to FIGS. 7 to 9. Reference will first be made to FIGS. 7 and 8, in which the guide tube 11 has a leading solid portion 11a. The major portion of the correcting mechanism 18 is, as shown, mounted on the outer surface of the solid portion 11a. As shown, the mechanism 18 includes a bearing 33 axially movably mounted on the outer surface of the solid portion 11a. Supported by this bearing 33 are oil pressure cylinders 34, 34' and 34'' which are shown three in number in this embodiment and which are also shown equi-angularly spaced from each other, by way example only. The chambers, defined by the walls of the cylinders 34, 34' and 34'' and divided into inner and outer chambers by pistons 35, 35' and 35'', are connected to the pilot conduits 19 for oil supply or discharge. Although not shown, suitable springs are provided in the chambers of the cylinders 34, 34' and 34'' at the both sides of the respective pistons 35, 35' and 35'', so as to balance the biasing forces of radially inward directions, so that the guide tube 11 and the pipe 10 are arranged in a concentric fashion under the normal conditions. Any of the piston rods 36 is provided at its radially outermost end with a ball bearing 37 which is rotatably received within a groove 38 formed in the inner periphery of the leading cylindrical member 15. In order to prevent soil or dusts from stealing into the bearing 33 and any of the cylinders 34, they may preferably be of sealed type or be enclosed by a cover 39. And, the radially relative movements of the guide tube 11 and the pipe 10 may also be made possible by enclosing any of the cylinders 34 with use of a flexible cover 41.

Let it be assumed in FIG. 8 that the displacement takes place to invite dislocation of the spot O on the surface of the photoelectric converter 26' to the spot O'. Then, the outer periphery of the pipe 10 has been dislocated from the circle P to the circle P', and the axis of the cylinders 34, 34' and 34'' are also dislocated from the lines X, Y and Z to the lines X', Y', and Z', respectively.

In order to eliminate the displacement on this assumption, oil under pressure is introduced into the inside of the piston 35', thus effecting movement of the cylinder 34' along the axis Y' toward the center of the pipe 10. It should be noted in this instance that no perpendicular component will be produced in the axial movement of the cylinder 34', but that other cylinders 34 and 34'' will move in the respective composed directions both of the movements along their axis X' and Y' and of the perpendicular directions. It should also be noted that these movements will not be subject to heavy resistances thanks to the actions of the ball bearings 37 and 37''. In any event, the first step of movement for correction is thus performed from the spot O' to the spot 0'', as shown in FIG. 8. At the second step, movement from the spot O'' to the correct spot O is carried out by introducing the pressurized oil into the insides of the pistons 35' and 35''. After these steps, the axis of the cylinders 34, 34' and 34'' will be coincident respectively with the correct lines X, Y and Z.

Then, the excavating operation is started again with the oil pressures remaining in the cylinders 34, 34' and 34'' being at a considerable level. In this meanwhile, however, the outer periphery of the leading member 15 is left at the position of the circle P' although the new excavated hole is correcated to be concentric to the circle P. Therefore, the auger 12 and the guide tube 11 under this condition are (kept to be) thrusted into the circle P for a while. Then, the oil pressures remaining in the three cylinders 34, 34' and 34'' are released to make their piston rods 36, 36' and 36'' free. After this, the pipe 10 is thrusted in the course of the excavating operation of the auger 12, and as a result of the leading member 15 will progressively become concentric to the circle P.

When, on the other hand, it is intended to automatically correct the displacement, a servo-valve 42 is interposed between each of the pilot conduits 19 and each of the cylinders 34, 34' and 34''. As shown in FIG. 9, the guide tube 11 is, in this instance, continuously rotated and thrusted without being stopped nor retracted. And, the deviation of the incident spot of the returning light beam from the center of the photoelectric converter 26' is converted into an electric signal, which is fed back to the input side of an amplifier 43. To this amplifier 43 is also supplied a command signal having a predetermined electric sequence, so that each of the cylinders 34, 34' and 34'' may be automatically controlled by means of the servo-valve 42. More specifically, the electric signal from the photoelectric converter 26' is extracted at all times during the pipe-thrusting operation. And, two of the servo-valves 42 are selected and are brought into operation in an independent manner of each other but in a concurrently co-active relationship with each other. Thus, two of the corresponding cylinders are actuated by the servo-valves to thereby finely control operations of the two corresponding pistons, so that the proceeding direction of the guide tube 11 and accordingly of its leading portion 11a is automatically and precisely corrected to coincide with the forward laser beam acting as the guide line.

Figure 10:
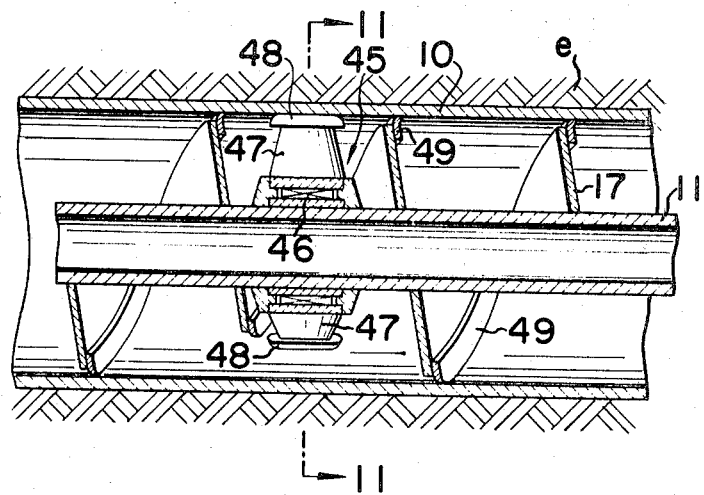
FIG. 10 is a longitudinal section showing a supporting mechanism as used in the present apparatus.
Figure 11:
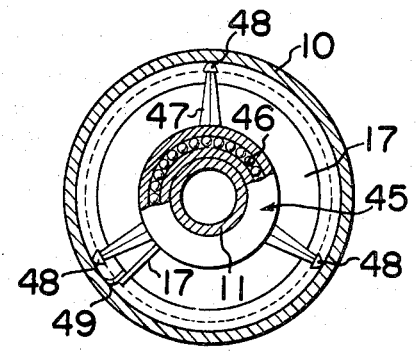
FIG. 11 is a cross section taken along the line 11 — 11 of FIG. 10.

Turning now to FIGS. 10 and 11, a supporting mechanism 45 is mounted on the outer wall of the guide tube 11 for preventing flexure of the pipe and the resultant friction with the guide tube 11, even when it has a remarkably large length. As shown, the supporting mechanism 45 includes a bearing rotatably carried on selected portions of the guide tube 11 where the screw conveyer 17 is partially removed. The bearing 46 may be of any type but preferably be of roller type, in which it is sealed up so as to be free from intrusion of dusts or soil. In this embodiment, three axially slender foot members 47 are radially outwardly extending from the bearing 46 and may preferably be equi-angularly spaced from each other. Each of the foot members 47 has a ridge 48 made irrotatable but axially slidable with respect to the inner wall of the pipe 10 thanks to its slender shape.

If desired, a flexible strip 49 may be, as shown in FIG. 10, adhered to the radially outer periphery of the screw conveyor 17 so as to have intimate slidable contact with the inner wall of the pipe 10, so that undesirable stick of the excavated soil to the particular inner wall can be effectively prevented.

As has been described in the above, the present invention should be appreciated useful in the civil engineering works for urban re-development, in which correct bury of pipes is indispensable for the utility facilities.

What is claimed is:

1. An apparatus for precisely thrusting a pipe into the ground along a predetermined straight guide line, comprising:

a straight guide tube normally substantially coaxially inserted in the pipe and having its foremost end extending therefrom, said guide tube being axially and rotationally movable relative to the pipe;

auger means coaxially removably attached to the foremost end of said guide tube for excavating the front soil when rotated and thrusted forward together with said guide tube;

a parallel reflector mounted in a relatively front portion of said guide tube in the vicinity of said auger means and having a critical optical path coincident with the axis of said auger means, said parallel reflector having such optical characteristics as to have reflected light rays follow said critical optical path, when incident light rays follow the same, and as to produce reflected light rays in parallel with incident light rays which have missed said critical optical path;

a highly directive light source disposed on a rear extension of the axis of said guide tube for normally emitting as the guide line a highly directive light beam in the forward direction along said critical optical path;

displacement detecting means for detecting displacement, if any abnormally, of the common axis of said auger means and said guide tube from the guide line in terms of displacement of the backward highly directive light beam, which is reflected on said parallel reflector, from the forward highly directive light beam which is emitted from said light source; and displacement correcting means interposed between the relatively front portion of said guide tube and a corresponding front portion of the pipe and responsive to the displacement of the highly directive light beam for deflecting said guide tube relative to the pipe in the direction to reduce the last-mentioned displacement substantially to zero, so that the course of said guide tube and accordingly of the pipe may follow precisely in the guide line.

2. An apparatus according to claim 1, wherein said parallel reflector includes a cube corner having its apex lie in the common axis of said auger means and said guide tube.

3. An apparatus according to claim 1, wherein said light source includes a laser beam generator for generating a laser beam when it is energized.

4. An apparatus according to claim 1, further comprising a screw conveyor mounted on the outer wall of the remaining portion of said guide tube in slidable contact with the corresponding inner wall of the pipe for conveying the excavated soil in the backward direction when it is rotated together with said guide tube.

5. An apparatus according to claim 1, wherein said displacement detecting means includes an optical plate disposed midway of an optical path between said light source and said parallel reflector and having a central transmissive portion sized and positioned to allow the forward highly directive light beam to pass therethrough.

6. An apparatus according to claim 1, wherein said displacement correcting means includes a plurality of cylinders mounted on the outer wall of the relatively front portion of said guide tube and spaced angularly from each other, a plurality of pistons having their inner ends hermetically received in said cylinders and their outer ends made in sliding engagement with the inner wall of the corresponding front portion of the pipe, actuating means having fluid communication with each of said cylinders for actuating the same radially outwardly extend said pistons so that said guide tube may be deflected relative to the pipe when said actuating means is energized, and control means responsive to the last-mentioned displacement for selectively energizing said actuating means.

7. An apparatus according to claim 1, further comprising a plurality of supporting mechanisms mounted on the outer wall of the remaining portion of said guide tube and each including a bearing rotatably carried on said guide tube and a plurality of axially slender foot members radially outwardly extending from said bearing and angularly spaced from each other, said foot members having their radial extensions made in irrotatable but axially slidable engagement with the inner wall of the corresponding remaining portion of the pipe for rigidly supporting the pipe so as to preventing flexure of the same.

8. An apparatus according to claim 5, wherein said optical plate includes a filter element having its light transmissivity radially varied; and wherein said displacement detecting means includes half mirror means disposed midway of an optical path between said light source and said parallel reflector for guiding sideways the reflected highly directive light beam, and a photoelectric converter disposed sideways of said half mirror means at a position to receive the reflected light beam, which is transmitted through said filter element, for detecting the last-mentioned displacement in terms of the deviation in the quantities of light from a predetermined level of reference.

9. An apparatus according to claim 1, wherein said displacement detecting means includes half mirror means disposed midway of an optical path between said light source and said parallel reflector for guiding sideways the reflected highly directive light beam, a photoelectric converter disposed sideways of said half mirror means at a position to receive the reflected light beam and having a plurality of photoelectric elements for generating electric signals independently of each other when the reflected light beam is incident thereupon, and comparator means electrically connected to each of said photoelectric elements for comparing said electric signals so as to detect the last-mentioned displacement in terms of the difference among the respective levels of said voltages.

10. An apparatus according to claim 9, wherein said photoelectric elements have a shape of quadrant.

* * * * *

UNITED STATES PATENT OFFICE
CERTIFICATE OF CORRECTION

Patent No. 3,857,449          Dated December 31, 1974

Inventor(s) YOSHITA KIMURA

It is certified that error appears in the above-identified patent and that said Letters Patent are hereby corrected as shown below:

Under Section [30] on Title Page, "April 20" should be

--April 2--

Signed and sealed this 1st day of April 1975.

(SEAL)
Attest:

RUTH C. MASON
Attesting Officer

C. MARSHALL DANN
Commissioner of Patents
and Trademarks